| United States Patent [19] | [11] 3,904,573 |
| --- | --- |
| Klein et al. | [45] Sept. 9, 1975 |

[54] MODIFIED UREA RESINS

[75] Inventors: Gerd Klein, Troisdorf; Kurt Schmoll, Hangelar, both of Germany

[73] Assignee: Dynamit Nobel Aktiengesellschaft, Troisdorf, Germany

[22] Filed: Aug. 15, 1973

[21] Appl. No.: 388,683

[30] Foreign Application Priority Data

Aug. 18, 1972 Germany.............................. 2240677

[52] U.S. Cl.................. 260/31.8 T; 260/15; 260/21; 260/32.6 N; 260/33.2 R; 260/856
[51] Int. Cl.............................................. C08c 11/44
[58] Field of Search........ 260/70 R, 31.8 T, 32.6 N, 260/33.2 R, 856

[56] References Cited
UNITED STATES PATENTS

| 1,793,667 | 2/1931 | Baldwin........................... 260/31.8 T |
| 3,637,549 | 1/1972 | Hall et al. ..................... 260/70 R X |

OTHER PUBLICATIONS

*Kirk–Othmer Encyclopedia of Chemical Technology,* (1963) V. 2, p. 232 (Chem. Lib.-TP9E68). D. N. Buttrey, *Plasticizers* 2nd ed. (1947) p. 42 (A.U. 145).

*Primary Examiner*—Donald E. Czaja
*Assistant Examiner*—S. M. Person
*Attorney, Agent, or Firm*—Burgess, Dinklage & Sprung

[57] ABSTRACT

A composition comprising urea, formaldehyde and caprolactam, the molar ration of urea to formaldehyde being from 1:1.2 to 1:1.8, especially a composition comprising a ureaformaldehyde condensation product containing caprolactam and at least one plasticizer; a method for decreasing the brittleness of urea-formaldehyde condensation products and articles made therefrom which comprises including in the urea-formaldehyde condensation reaction mixture caprolactam especially in an amount from 0.5 to 15 percent by weight, based upon the amount of urea present.

7 Claims, No Drawings

MODIFIED UREA RESINS

BACKGROUND OF THE INVENTION

1. Field of the Invention

This invention relates to the preparation of thermosetting molding compositions and particularly to urea-formaldehyde condensation molding polymers. More particularly, this invention relates to a method for decreasing the tendency of urea-formaldehyde condensation polymers to produce brittleness in final form objects. More especially, this invention is directed to shaped articles of urea-formaldehyde condensation polymers having a decreased brittleness, said shaped articles containing therein caprolactam.

2. Discussion of Prior Art

For the preparation of thermosetting molding compounds it is known to mix condensation products based on urea and formaldehyde with fillers, preferably cellulose, lubricants such as zinc stearate and waxes, colorants, and a hardening accelerator, then dry them and compress them to form a free-flowing granular product. The molding compound granules can be made in all shades of colors owing to the colorfastness of the urea resins, and they can be fabricated into color-fast moldings having very valuable electrical characteristics. The known brittleness of pure urea resins has been diminished by the above-described admixture of additives and further processing to thermosetting molding compounds, but in the products molded from such compounds a certain degree of brittleness is definitely present in the form of poor resistance to breakage. This is manifest especially in those moldings in which locking studs, such as those used frequently in the electrical industry, or thin ribbing, are exposed to great mechanical stress. Pieces made by the injection molding or urea resin molding compounds are known to have a great tendency to craze.

The brittleness of such injection moldings is greater than in compression moldings and is known to be intensified by the filler orientation which takes place in the injection process. The crazing or cracking tendency of injection-molded articles, which is due to the brittleness of the material on the one hand and to filler orientation on the other, appears when they are stored with exposure to heat in accordance with DIN 53,498.

It is also known to add suitable plasticizers to urea resin molding compounds to improve their fluidity or their injection molding characteristics. Such molding compounds show an improved plasticity even under preheating conditions. These plasticizer additives, however, do not produce any elasticizing effect in the hardened compression or injection molding and thus do not lead to more breakage-resistant products. Plasticizers suitable for compression and injection molding compounds are, for example, aliphatic monovalent, preferably polyvalent alcohols, such as ethylene glycol, diethylene glycol, or glycerin; also, ethers of polyvalent alcohols or also aliphatic diamines or alkanolamines as well as fatty acid esters such as dialkylphthalate, for example.

SUMMARY OF THE INVENTION

In accordance with the present invention it has now been found that moldings having improved resistance to crazing can be obtained by modifying the urea resins with a lactam, especially carprolactam. Thus, the present invention broadly contemplates a composition comprising urea, formaldehyde and caprolactam, the molar ratio of urea to formaldehyde being from 1:1.2 to 1:1.8. In a particularly desirable embodiment the present invention contemplates such a composition wherein the urea-formaldehyde is present in the form of a urea-formaldehyde condensation product.

In accordance with the present invention molding compositions which provide shaped articles of improved resistance to crazing can be prepared by a process in which urea and formaldehyde are condensed. The condensation process can be carried out in the presence of caprolactam. Alternatively, the caprolactam can be admixed with the final condensation product to produce a modified urea-formaldehyde resin which provides a shaped article with improved resistance to crazing or cracking. Additionally, the process can be carried out by introducing the caprolactam to a urea-formaldehyde condensation reaction mixture prior to commencement of the condensation reaction. Alternatively, the caprolactam can be introduced to the condensation reaction mixture during the condensation reaction.

In preparing molding compositions of urea-formaldehyde, the caprolactam, as indicated above, can be added to the final condensation product. It is desirable to include, in such cases, a plasticizer or a mixture of plasticizers. Indeed, the caprolactam and plasticizer or plasticizer mixture can be incorporated with the urea and formaldehyde either at the beginning, at the end or during the urea-formaldehyde condensation. Such produces a thermosetting molding composition.

DESCRIPTION OF PREFERRED EMBODIMENTS

It has been found that good results are achieved when the amount of caprolactam is from 0.5 to 15 percent by weight based upon the amount of urea present in the molding composition. Thus, injection- and compression-molded articles prepared from the molding composition containing caprolactam exhibit an increased resistance to crazing and cracking. This increased resistance to crazing or cracking improves with the percentage of caprolactam included in the molding composition.

It has proven to be particularly advantageous to employ the caprolactam in amounts of from 1 to 7 percent by weight, based upon the amount of urea component in the molding composition. This amount of caprolactam is particularly useful in reducing the brittleness of compression-molded products. To reduce the brittleness of injection-molded products, it has been found especially advantageous to employ caprolactam in an amount from 7 to 12 percent by weight, based upon the amount of urea component.

To improve the fluidity of the molding composition, it is advantageous to employ a plasticizer together with the caprolactam. This is especially advantageous and desirable in cases where the molding composition is to be employed in an injection molding process. Thus, injection molding urea-formaldehyde compositions containing caprolactam preferably contain at least one plasticizer present in an amount between 0.5 and 5 weight percent, based upon the weight of the molding composition. Suitable plasticizers would include the dialkyl phthalates, especially dialkyl phthalates having between $C_1$ and $C_4$ carbon atoms in the alkyl group. These dialkyl phthalates are generally present in an amount between 0.5 and 5 weight percent, preferably 1 to 3 weight percent, based on the weight of the molding composition. Other plasticizers which can be employed include: ethylene-glycol, diethylene-glycol, glycerine; also ethers of polyvalent alcohols with 2 to 6 C-atoms or aliphatic diamines with 2 to 8 C-atoms and the corresponding alkanol amines. Examples for said ethers are monocresylglycerine-ether or glycerine-di-cresyl-ether. In the event that the plasticizer to be employed is insoluble in the fluid resin, it is desirable to employ the same either in combination with monovalent, preferably polyvalent alcohols, or dissolved in other resin-compatible plasticizers. The plasticizers or plasticizing mixture can be added together with the caprolactam, if desired, either at the beginning, at the end or during the urea-formaldehyde condensation, or during the process whereby the condensate is made into a molding composition.

The compositions of the present invention as well as the injection-molded or compression-molded articles made therefrom can be prepared by the generally known method in the art. For instance: formaldehyde and urea can be condensed in an aqueous alkaline medium at an elevated temperature, e.g., within 40 minutes at a temperature of 50°C. The water is then removed from the mixture by vacuum distillation until the fluid resin reaches the desired density. A suitable density is about 1.2 grams per cubic centimeter, determined at 40°C. This liquid resin is then mixed with caprolactam, a hardening accelerator such as zinc sulfite, a filler such as cellulose, a lubricant such as stearic acid and their salts, e.g. zinc stearate, a pigment such as lithopone and, if desired, a plasticizer or combination or plasticizers such as dimethylphthalate and diethylene-glycol. The composition is then dried and ground up. Powdered molding compounds thus obtained are granulate and the granules are made into molded products in a manner well known in the art. This can be done in injection or compression molding dies.

In order to more fully illustrate the nature of the invention and the manner of practicing the same, the following Examples are set forth. These Examples show the various methods by which the caprolactam can be included with the urea-formaldehyde. These Examples further show that the shaped articles prepared from the urea-formaldehyde molding composition have improved resistance to cracking or crazing.

EXAMPLE 1

3555 parts by weight of an aqueous, 37 weight percent solution of formaldehyde were heated to 50°C and adjusted to a pH of 7.2 with triethanolamine. After the addition of 1950 parts of urea by weight, the mixture was condensed at a temperature of 50°C and at the pH of 7.7 which established itself. After 40 minutes of condensation time the water was removed by vacuum distillation until the liquid resin had attained a density of 1.190 g/cm³ (40°C).

Into three individual specimens of this liquid resin, 5, 10 and 15 weight percent, respectively, of caprolactam was stirred, with reference to the amount of urea put in. A fourth liquid resin specimen was left without caprolactam for purposes of comparison.

The four resins with their solid content of 44 to 48% by weight were made in the same manner into compression molding compounds. For this purpose, 5500 weight-parts of liquid resin was mixed in each case with 42 weight-parts of zinc sulfite, 1340 weight-parts of cellulose, 23 weight-parts of zinc stearate, and 60 weight-parts of lithopone, and the mixture was dried and ground up. The powdered compression molding compounds thus obtained were then granulated all under the same conditions. The four granulated compounds thus obtained were made into standard cups using the die in accordance with DIN 53,465 at a pressing temperature of 150°C and a setting time of 45 seconds.

To measure the molded elasticity the following test method was used:

The upper marginal area of the standard cup with its outside diameter of 74 mm was gripped between the jaws of a vise-like test apparatus. Then the distance between these jaws was reduced with a uniformly increasing force until crazing occurred in the deforming cup. The minimum jaw separation reached at this point served as a measure of the brittleness of the piece being tested.

The present example yielded the following results:

| Caprolactam content, %: | 0 | 5 | 10 | 15 |
|---|---|---|---|---|
| Min.jaw separation (mm): | 57.5 | 57.1 | 56.5 | 56.0 |

Accordingly, moldings made from urea resin compression molding compounds have a resistance to fracture which increases as the percentage of caprolactam increases.

EXAMPLE 2

Three batches of 3555 weight-parts each of an aqueous solution of 37% formaldehyde by weight, 1950 weight-parts of urea and 2, or 7, or 12%, respectively of caprolactam with reference to the amount of urea, were condensed at a pH of 7.7 and at a temperature of 50°C for 40 minutes. After vacuum distillation, fluid resins with solid content of 44 to 48% by weight were obtained. The three fluid resins were made into cellulose-filled compression molding granules as described in Example 1.

In the manner explained in Example 1, the brittleness of the standard cups molded from these three compounds was determined by measuring the minimum jaw separation in the above-described vise-like test apparatus and the following results were obtained:

| Caprolactam content, %: | 2 | 7 | 12 |
|---|---|---|---|
| Min.jaw separation, mm: | 57.3 | 56.8 | 56.4 |

Even when caprolactam is added before the urea-formaldehyde condensation begins, the results are much the same as those obtained in Example 1.

EXAMPLE 3

Four liquid resin specimens, prepared as in Example 1, Paragraph 1, were mixed with 2.5 weight percent diethylene glycol, 2 weight percent dimethylphthalate and 5, 8, 10 and 15 weight percent caprolactam, respectively, the percentages relating to the amount of urea put in. For comparison purposes an additional liquid resin specimen was used which was free of the above-named additives.

These five resins were made into granulated urea resin molding compounds in the manner described in Example 1, Paragraph 3.

The five compounds obtained were injection-molded in a Duroplast injection molding machine under comparable working conditions (cylinder temperatures: 70/70/80/90 (nozzle), mold temperature: 145°C/145°C, injection pressure: 1400 kp/cm², injection time: 2 to 4 seconds) to form box covers of a rectangular cross section of 92 × 78 mm, a height of 60 mm and wall thicknesses of 3 to 9 mm.

As a test for crazing sensitivity the injection-molded products prepared from these five compounds were exposed to heat in accordance with DIN 53,498 and the test temperature was determined at which the first surface alterations were produced in the articles after 48 hours of exposure.

The measurements gave the following results:

| | | | | | |
|---|---|---|---|---|---|
| Caprolactam content(%) | — | 5 | 8 | 10 | 15 |
| Diethylene glycol content (%) | — | 2.5 | 2.5 | 2.5 | 2.5 |
| Dimethylphthalate content (%) | — | 2.0 | 2.0 | 2.0 | 2.0 |
| Resistance of the articles to crazing after 48 h of exposure | | | | | |
| at 20°C | good* | good | good | good | good |
| at 60°C | C | good | good | good | good |
| at 70°C | | good | good | good | good |
| at 75°C | | C | good | good | good |
| at 80°C | | | good | good | good |
| at 85°C | | | C | good | good |
| at 90°C | | | | C | good |

C = crazing
* = crazing after 2 to 4 days

As it can be seen from the information in this table, the injection-molded articles exhibit an increasing resistance to crazing as the caprolactam content increases.

EXAMPLE 4

Of two liquid resin specimens, prepared as in Example 1, Paragraph 1, one was given an addition of 2.5 weight percent diethylene glycol and the other an addition of 2.5 weight percent diethylene glycol and 2 weight percent dimethylphthalate. Both resins were made into granulated urea resin molding compound as described in Example 1, Paragraph 3. The injection-molded products prepared from the two compounds, when tested under conditions described in Example 3, showed the same performance as regards resistance of crazing as a urea resin molding compound which did not contain these additives; the pieces crazed after only 2 to 4 days at room temperature.

The crazing resistance of the molded products which was found in Example 3 is accordingly not brought about by the addition of diethylene glycol and dimethylphthalate alone, but in combination with caprolactam, in the embodiments described in Examples 3 and 5.

EXAMPLE 5

Four batches, each of 3555 weight-parts of an aqueous solution of 37 weight percent formaldehyde, 1950 weight-parts urea, 48.8 weight-parts diethylene glycol, 39 weight-parts dimethyl(phthalate, and 5, 8, 10 and 15 weight percent, respectively, of caprolactam with reference to the urea, were condensed for 40 minutes at a pH of 7.7 and a temperature of 50°C. After vacuum distillation, liquid resins were obtained with a solid resin content of about 47 weight percent.

The four liquid resins were made into cellulose-filled molding granules as described in Example 1. The compounds were injection molded under the conditions described in Example 3 to form the same kind of covers. After exposure to heat in accordance with DIN 53,498, these covers had the same crazing resistance values as shown in the table in Example 3, in accordance with their caprolactam content.

The addition of caprolactam, diethylene glycol and dimethyphthalate before or after the urea resin condensation thus produces the same effect.

What is claimed is:

1. A molded shaped article containing a hardened urea-formaldehyde condensation polymer, a filler, a lubricant, colorants or pigments said polymer having a urea-formaldehyde molar ratio from 1:1.2 to 1:1.8, and containing caprolactam.

2. An article according to claim 1 wherein said caprolactam is present in an amount from 1 to 15% by weight based on the amount of urea present.

3. An article according to claim 2 wherein said article contains at least one plasticizer.

4. A compression molded shaped article according to claim 1 wherein said caprolactam is present in an amount between 1 and 7% by weight based on the amount of urea present.

5. An injection molded shaped article according to claim 1 wherein said caprolactam is present in an amount between 7 and 12% by weight based upon the amount of said urea.

6. In a compression molding process wherein a urea-formaldehyde molding composition is compression molded to form a compression molded shaped article which molding composition has a urea/formaldehyde molar ratio of 1:1.2 to 1:1.8, the improvement for improving crazing or cracking resistance of the article which comprises including in said molding composition caprolactam in an amount between 1 and 7% by weight based upon the weight of said urea.

7. In an injection molding process wherein a urea-formaldehyde molding composition is injection molded to form a shaped article which molding composition has a urea/formaldehyde molar ratio of 1:1.2 to 1:1.8, the improvement for improving crazing or cracking resistance of the article which comprises including in said composition caprolactam in an amount between 7 and 12% by weight based upon the weight of said urea.

* * * * *